United States Patent [19]

Haase

[11] Patent Number: 5,575,937
[45] Date of Patent: Nov. 19, 1996

[54] MOLDED BAKERY PROOFER TRAY

[75] Inventor: Stuart L. Haase, Bloomington, Minn.

[73] Assignee: Bakery Solutions, Inc., Bloomington, Minn.

[21] Appl. No.: 452,413

[22] Filed: May 26, 1995

[51] Int. Cl.$^6$ .............. A21C 13/02; A21C 7/04
[52] U.S. Cl. .......... 249/119; 249/134; 249/137; 198/706; 198/712; 198/714; D7/357
[58] Field of Search .............. 249/119, 120, 249/134, 137; D7/672, 357; 198/706, 712, 714, 803.01, 803.14

[56] References Cited

U.S. PATENT DOCUMENTS

| | | | |
|---|---|---|---|
| D. 51,881 | 3/1918 | Evans | D7/357 |
| D. 271,177 | 11/1983 | Lucido | D7/672 |
| D. 286,733 | 11/1986 | Dahlke | D7/357 |
| 1,712,211 | 2/1928 | Hanson et al. | 198/714 |
| 1,986,950 | 1/1935 | Vandegrift | 209/307 |
| 2,158,911 | 5/1939 | Pellar | 220/23.2 |
| 2,291,672 | 8/1942 | Youngberg | 249/119 |
| 3,021,695 | 2/1962 | Voigtmann | 249/134 |
| 3,146,730 | 9/1964 | White | 426/496 |
| 3,287,807 | 11/1966 | Menke | 425/84 |
| 3,381,796 | 5/1968 | Gregor | 198/706 |
| 3,804,583 | 4/1974 | Parkes | 198/706 |
| 3,807,057 | 4/1974 | Noel | 34/237 |
| 4,205,091 | 5/1980 | Van Horne | 426/138 |
| 4,334,665 | 6/1982 | Noel | 249/134 |
| 4,356,995 | 11/1982 | Lohner | 249/134 |
| 4,395,427 | 7/1983 | Fischer et al. | 426/231 |
| 4,398,880 | 8/1983 | Seiling | 198/646 |
| 4,560,139 | 12/1985 | Dahlke | 249/112 |
| 4,668,174 | 5/1987 | Williams | 425/333 |

OTHER PUBLICATIONS

"Proofer Trays seamless plastic", Aeromat Plastics brochure, undated.
"Overhead Proofer Trays", Pak–It Mfg. Co. Inc. catalog, p. 2482, undated.

*Primary Examiner*—James P. Mackey
*Attorney, Agent, or Firm*—John W. Bunch

[57] ABSTRACT

A molded proofer tray (10) for use in commercial bakeries, includes threaded inserts (28) molded directly into the outer end (14) walls for removably receiving mounting pins (30) to facilitate repair if damaged. A female embodiment (40) is also provided.

19 Claims, 1 Drawing Sheet

U.S. Patent     Nov. 19, 1996     5,575,937
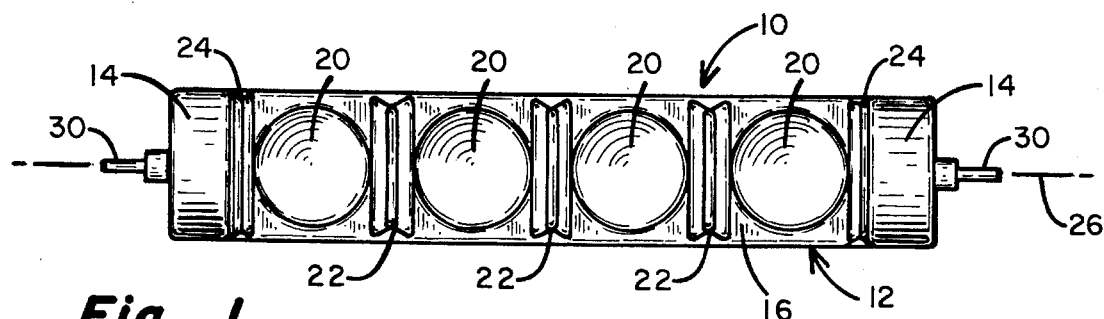
_Fig. 1_
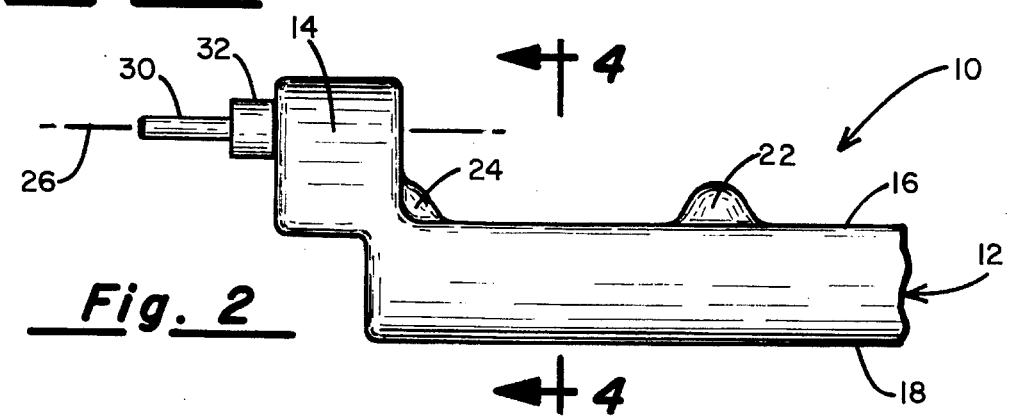
_Fig. 2_
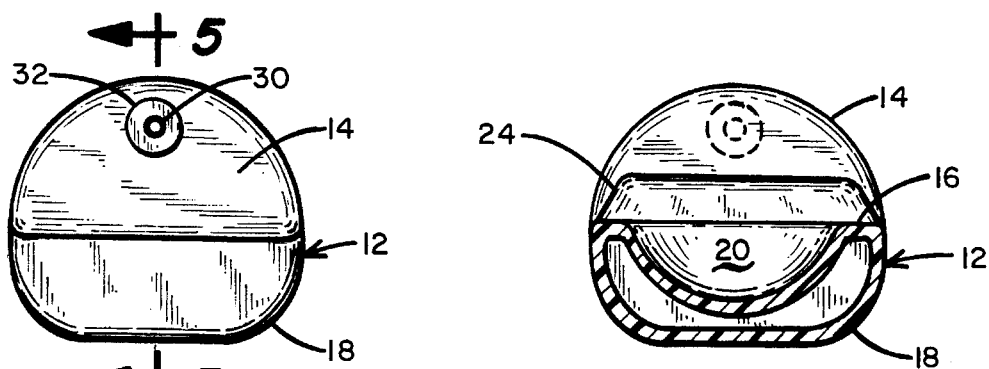
_Fig. 3_          _Fig. 4_
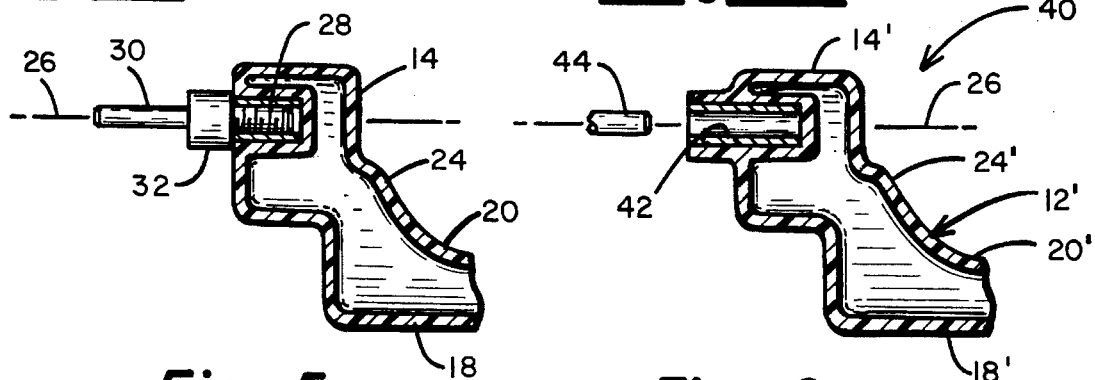
_Fig. 5_          _Fig. 6_

MOLDED BAKERY PROOFER TRAY

TECHNICAL FIELD

The present invention relates generally to specialized receptacles. More particularly, this invention concerns a molded bakery proofer tray of improved construction.

BACKGROUND ART

In commercial bakeries, proofer trays are used in an intermediate step of the baking procedure. After the dough has been prepared and divided, it is formed into balls and then deposited into trays for conveyance through a proofer box. A succession of such proofer trays, each carrying 4 to 6 dough balls, are pivotally supported on mounting pins between conveyor chains. The proofer box provides a controlled environment to allow time for proofing or rising of the dough balls during passage of the trays. After the trays have passed through the proofer box, they are tipped over to discharge the dough balls so that they can then be conveyed to a molder-panner for further forming and baking.

Various such proofer trays have been available heretofore. Proofer trays have been constructed from wood or metal having suitable pockets or cups for receiving the doughballs. U.S. Pat. No. 1,712,211 to Hanson is representative of the early prior art in this regard. Such trays usually required dusting with flour or spraying with oil to facilitate release of the dough balls after passage through the proofer box. In addition, these early proofer trays were typically constructed in a manner characterized by seams, crevices, etc. which tended to accumulate undesirable deposits of excess materials and contaminants, which in turn made it difficult to maintain the necessary cleanliness. These early proofer trays thus required frequent maintenance and cleaning, which of course was time consuming and expensive in terms of the overall baking operation.

More recently, proofer trays of molded plastic construction have become available. U.S. Pat. Nos. 4,398,880 and 4,560,139 are representative the prior art in this regard. However, while molded plastic construction has facilitated cleanliness, such proofer trays are difficult to repair if damaged. The mounting pins at the ends of such proofer trays can easily become bent or damaged if the conveyor chains should lurch, bind, etc. Because of their construction, the mounting pins in the trays of the prior art are not readily repairable. For example, hot air welding is typically used in constructing the mounting pin assemblies after molding the Aeromat Plastics tray shown in U.S. Pat. No. 4,560,139. This causes the surrounding molded material to become hard and brittle, leading to cracking and breakage at both ends of each tray. This in turn has often required replacement of the entire proofer tray upon even slight damage to either mounting pin.

A need has thus arisen for a proofer tray of improved construction. Heretofore, there has not been available a molded bakery proofer tray which is not only adapted to facilitate cleanliness, but which is also more structurally sound and adapted to facilitate repair if damaged.

SUMMARY OF INVENTION

The present invention comprises an improved bakery proofer tray which overcomes the foregoing and other difficulties associated with the prior art. In accordance with the invention, there is provided a proofer tray having an elongate hollow symmetrical body formed entirely of molded plastic. The interior of the body is entirely sealed to prevent entry and accumulation of possible contaminants. A plurality of cups are provided in the top surface of the body for receiving the dough balls. The ends of the body are raised and formed to act as camming surfaces to facilitate tipping and thus discharge of the dough balls after proofing. Rigid metal inserts are molded directly into the outer walls of the raised ends during the process to define the longitudinal tipping axis, without making the tray susceptible to breakage at the ends.

In a first embodiment, the metal inserts are internally threaded for receiving externally threaded ends of removable mounting pins.

In a second embodiment, the inserts are internally smooth for loosely receiving the outer ends of conveyer mounting pins.

BRIEF DESCRIPTION OF DRAWING

A better understanding of the invention can be had by reference to the following Detailed Description in conjunction with the accompanying Drawing, wherein:

FIG. 1 is a top view of a molded bakery proofer tray incorporating a first embodiment of the invention;

FIG. 2 is an enlarged side view of one end thereof;

FIG. 3 is an enlarged end view thereof;

FIG. 4 is a sectional view taken along lines 4—4 of FIG. 2 in the direction of the arrows;

FIG. 5 is a sectional view taken along lines 5—5 of FIG. 3 in the direction of the arrows;

FIG. 6 is a partial view of a molded bakery proofer tray incorporating a second embodiment of the invention.

DETAILED DESCRIPTION

Referring now to the Drawing, wherein like reference numerals designate like or corresponding elements throughout the views, and particularly referring to FIGS. 1 through 5, there is shown a bakery proofer tray 10 incorporating the invention. As will be explained more fully hereinafter, the proofer tray 10 is of improved construction to facilitate cleanliness and maintenance as well as repair if damaged.

The proofer tray 10 comprises an elongate hollow symmetrical body 12 having raised opposite ends 14. The exterior surface of body 12 is continuous and smooth. In particular, the exterior surface of body 12 includes a generally flat top surface 16 and a generally rounded bottom surface 18. The top surface 16 includes a plurality of rounded recesses or cups 20 for individually receiving the dough balls (not shown) to be proofed. As shown, four such cups 20 are provided. If desired, six cups 20 could instead be provided. It will be understood that any suitable number can be provided and that the number of cups is not critical to practice of the invention.

The top surface 16 of body 12 also includes raised transverse ribs 22 and 24. The full ribs 22 extend between adjacent cups 20. The partial ribs 24 extend between the endmost cups and the adjacent ends 14. The primary purpose of ribs 22 and 24 is to individually guide the dough balls into cups 20. The transverse ribs 22 and 24 also provide torsional rigidity to tray 10.

The body 12 is preferably formed from plastic by rotational molding. Any suitable plastic may be utilized. For example, in the preferred embodiment, the body 12 is formed from FDA approved virgin resin or high density polyethylene having a substantially uniform wall thickness of about ³⁄₁₆ths inch. The cups 20 are preferably about 3 and ¼th inch in diameter and about ⅝ths to ⅞ths inch deep.

The upper surfaces of ends 14 are preferably rounded as shown to act as camming surfaces for engagement with fixed tipping bars (not shown) to discharge the dough balls after conveyance through the proofer box.

Mounting structure is provided in the raised semicylindrical ends 14 of the body 12 for supporting tray 10 for pivotal movement about a longitudinal axis 26 extending above the top surface 16 of the body. In particular, a metal insert 28 is molded directly into the outer end wall of each end 14 of the body 12, as is best seen in FIG. 5. As shown, the sides and inner end of each insert 28 are completely surrounded by a portion of the outer wall of the end 14 such that the interior of the hollow body 12 is completely sealed and free from ingress of possible contaminants. The outer end of the cylindrical insert 28 is open and substantially flush with the end tray surface, but the inner end is closed by the molded outer wall of end 14. In the preferred embodiment, the metal insert 28 comprises an internally threaded brass bushing adapted to receive the externally threaded end of a mounting pin 30. The surrounding surface of the insert 28 is preferably knurled or longitudinally striated for reinforcement against turning within the molded outer wall of end 14.

This comprises a significant feature of the present invention because it facilitates removal, repair and/or replacement if necessary of the mounting pins 30 should they become bent or damaged. The insert 28 is incorporated into tray 10 directly, during molding, without the disadvantages associated with welding.

In the preferred embodiment, the mounting pins 30 are formed from stainless steel, with an intermediate shoulders 32 which act as spacers when the smooth ends of the pins are inserted into the conveyor chains (not shown). The abutting faces of shoulders 32 also serve to seal around the outer ends of inserts 28. A suitable thread compound, such as LOC-TITE, is preferably applied to the pins 30 before connection to inserts 28. With mounting pins 30, tray 10 is commonly referred to as a male type tray.

FIG. 6 shows a tray 40 incorporating a second embodiment of the invention. Since the tray 40 incorporates components which are substantially similar to components of the tray 10 of the first embodiment, the same reference numerals have been utilized to identify such components, but with prime (') notations for differentiation.

The primary difference between the two embodiments resides in the fact that tray 40 incorporates a metal insert 42 which is smooth instead of internally threaded as in insert 28, for loosely receiving opposing mounting pins 44, only one of which is shown exploded away, carried directly on the conveyer chains (not shown). With inserts 42, the tray 40 is commonly referred to as a female type tray.

From the foregoing, it will thus be appreciated that the present invention comprises an improved bakery proofer tray having several advantages over the prior art. The trays herein are adaped to facilitate repair, without necessarily replacing the entire tray, at the end mounts. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any alternatives, equivalents, modifications and/or rearrangements falling within the scope of the invention as defined by the following claims.

What is claimed is:

1. A bakery proofer tray, comprising:

an elongate hollow body formed from molded plastic;

said body having a continuous external surface including a top surface, a bottom surface, and opposite raised ends;

the top surface of said body including a plurality of longitudinally spaced apart cups therein for receiving dough balls to be proofed;

each raised end of said body including an outer end wall; and mounting means including coaxial rigid generally cylindrical inserts molded directly into the outer end walls of the ends of said body for pivotally supporting the tray about a longitudinal tipping axis between conveyor chains moving in a tranverse direction.

2. The proofer tray of claim 1, wherein said plastic comprises high density polyethylene.

3. The proofer tray of claim 1, wherein four cups are provided in the top surface of said body.

4. The proofer tray of claim 1, wherein six cups are provided in the top surface of said body.

5. The proofer tray of claim 1, wherein said mounting means comprises:

a straight pin having an externally threaded end, an opposite smooth end, and a raised intermediate shoulder;

the insert being internally threaded for removable connection to the externally threaded end of said pin.

6. The proofer tray of claim 1, wherein the insert of said mounting means is adapted for rotatably receiving pins carried on the conveyor chains.

7. The proofer tray of claim 1, wherein the top surface of said body includes a tranverse rib between each adjacent pair of cups.

8. A bakery proofer tray, comprising:

an elongate hollow body formed from molded plastic;

said body having a continuous external surface including a top surface, a bottom surface, and opposite raised ends;

the top surface of said body including a plurality of longitudinally spaced apart cups therein for receiving dough balls to be proofed;

each raised end of said body including an outer end wall;

a rigid insert molded directly into the outer end wall of each end of said body for defining a tipping longitudinal pivot axis; and mounting pin means for selectively connecting each insert with an associated conveyor chain moving in a tranverse direction.

9. A bakery proofer tray, comprising:

an elongate hollow body formed from molded plastic;

said body having a top surface, a bottom surface, and opposite raised ends;

the top surface of said body including a plurality of longitudinally spaced apart cups therein for receiving dough balls to be proofed;

each raised end of said body including an outer end wall; and mounting means including coaxial rigid generally cylindrical inserts molded directly into the outer end walls of the ends of said body for rotatably receiving pins on parallel conveyor chains moving in a tranverse direction for pivotally supporting the tray about a tipping longitudinal axis.

10. The proofer tray of claim 1, wherein the top surface of said body is generally flat and the bottom surface is generally rounded.

11. The proofer tray of claim 1, wherein the longitudinal tipping axis extends above the top surface of said body, and wherein portions of the raised ends of said body are shaped to act as camming surfaces to pivot said body about said axis and thus discharge the dough balls after proofing.

12. The bakery proofer tray of claim 8, wherein the plastic comprises high density polyethylene.

13. The bakery proofer tray of claim 8, wherein the top surface of said body is generally flat and the bottom surface is generally rounded.

14. The bakery proofer tray of claim 8, wherein said inserts are coaxial about the longitudinal tipping axis, which axis extends above the top surface of said body.

15. The bakery proofer tray according to claim 14, wherein each raised end of said body includes an inner wall spaced from the outer wall, said inserts being molded directly only into the outer walls of the ends.

16. The bakery proofer tray of claim 9, wherein the plastic comprises high density polyethylene.

17. The bakery proofer tray of claim 9, wherein the top surface of said body is generally flat and the bottom surface is generally rounded.

18. The bakery proofer tray of claim 9, wherein said inserts are coaxial about the longitudinal tipping axis, which axis extends above the top surface of said body.

19. The bakery proofer tray according to claim 18, wherein each raised end of said body includes an inner wall spaced from the outer wall, said inserts being molded directly only into the outer walls of the ends.

* * * * *